UNITED STATES PATENT OFFICE.

GUSTAVE GARRELL, OF BALTIMORE, MARYLAND.

COMPOUND FOR PREVENTING MORTAR FROM FREEZING.

SPECIFICATION forming part of Letters Patent No. 409,397, dated August 20, 1889.

Application filed December 22, 1888. Serial No. 294,377. (No specimens.)

*To all whom it may concern:*

Be it known that I, GUSTAVE GARRELL, of Baltimore city, in the State of Maryland, have invented a new and useful Improvement in Compound for Preventing Mortar from Freezing, of which the following is a specification.

My invention is in the nature of a new composition of matter to be added to lime or cement mortars to prevent them from freezing.

I take one bushel of common salt, (chloride of sodium,) and after pulverizing it mix with it one and a quarter bushel of coal-ashes, which have also been previously pulverized or ground fine. These ingredients are thoroughly mixed and raised to a temperature of 130° Fahrenheit to expel all moisture. I then let the mass cool and add one and a quarter pound of saltpeter (nitrate of potash) and three pounds of sulphate of iron, which latter ingredients are finely ground or pulverized before being added to the salt and coal-ashes. The coal-ashes I use mainly as an inert vehicle or diluent to keep the mass in a state of powder, and in some cases I may use fine dry sand in the place of the coal-ashes. This mixture, when prepared, is a dry powder, and in using it about one part, by weight, of my compound is mixed with ten parts of ordinary lime or cement mortar. In lime mortar it is sprinkled into and homogeneously mixed with the mortar as it is used; but in cement mortars it is (for more thorough admixture) first intimately mixed with the sand, and the cement and water are added afterward.

This compound I find will, when added to the mortar, as above described, effectually prevent it from freezing, and does not produce any deleterious influence upon the strength or setting qualities of the mortar.

Having thus described my invention, what I claim as new is—

The composition herein described for preventing mortar from freezing, consisting of common salt, saltpeter, sulphate of iron, and coal-ashes, or its described equivalent, mixed in or about the proportions described.

GUSTAVE GARRELL.

Witnesses:
SOLON C. KEMON,
WM. H. BATES.